March 28, 1967   H. GALMAN   3,311,826
MEASURING SYSTEM STANDARD UTILIZING AMPLIFIER WITH RECTIFIER
IN NEGATIVE FEEDBACK PATH TO COMPENSATE RECTIFIER
FORWARD VOLTAGE DROP
Filed Oct. 25, 1962
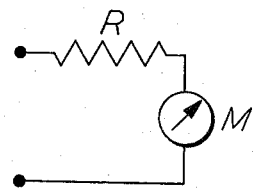
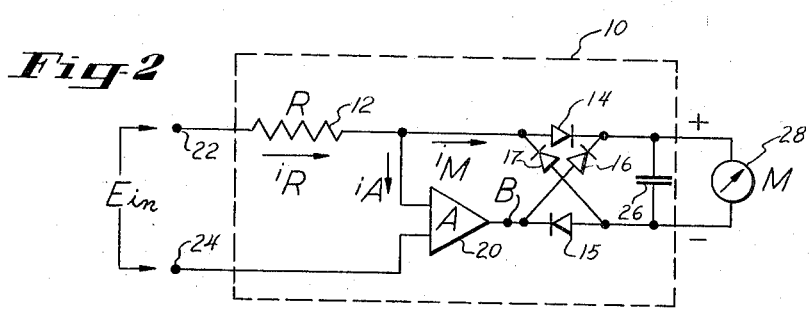
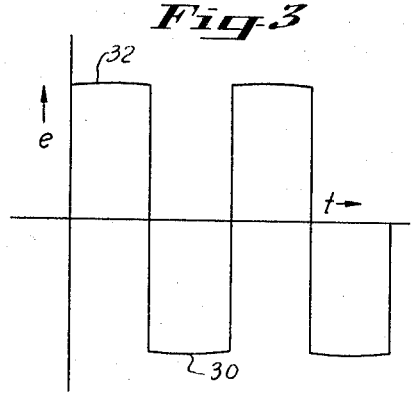
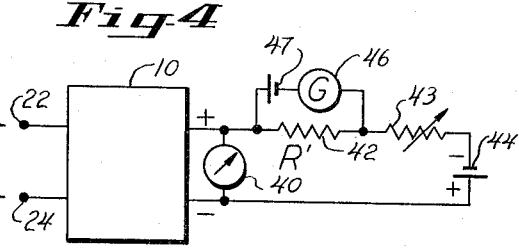
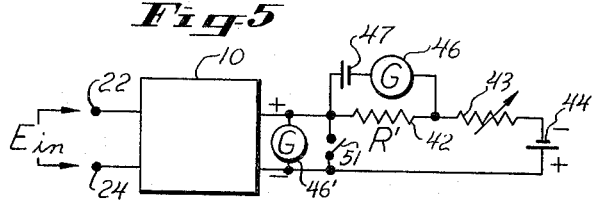
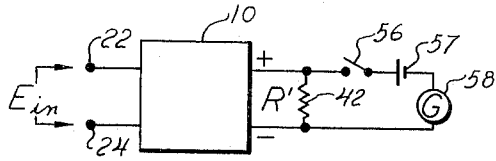
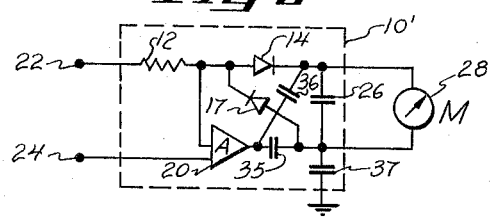
INVENTOR.
HERBERT GALMAN
BY
Fraser and Bogucki
Attorneys.

United States Patent Office 3,311,826
Patented Mar. 28, 1967

3,311,826
MEASURING SYSTEM STANDARD UTILIZING AMPLIFIER WITH RECTIFIER IN NEGATIVE FEEDBACK PATH TO COMPENSATE RECTIFIER FORWARD VOLTAGE DROP
Herbert Galman, 1612 N. Altadena Drive,
Pasadena, Calif. 91107
Filed Oct. 25, 1962, Ser. No. 232,995
2 Claims. (Cl. 324—123)

This invention relates to electrical measuring instruments and more particularly to such instruments which are utilized for measuring electrical voltages or currents with extreme precision.

In the field of electrical measuring instruments, considerable effort has gone into the development of instruments which possess the desirable attributes of ruggedness, reliability, accuracy, compactness and simplicity. Although instruments of reasonable accuracy have been developed which are satisfactory for general use as electrical measuring instruments, when extreme accuracy is desired one must resort to a laboratory type of instrument which is, in most cases, extremely sensitive, difficult to set up and calibrate, and so cumbersome as to be essentially non-portable. Instrument designers have gone to considerable lengths in trying to achieve the desired accuracy and precision which may be realized from such laboratory measuring standards, but without realizing the desired combination of an accuracy approaching that of a Bureau of Standards certified measuring standard and the simplicity, ruggedness and reliability of the ordinary bench type volt-ammeter.

Furthermore, such devices as have been developed have been limited in varying degrees in their frequency response and are generally incapable of accurately measuring both alternating current (A.C.) and direct current (D.C.). In addition, such measuring devices as are known generally operate on a measurement of either the peak value or the effective, or R.M.S. (root mean square), value of an applied voltage or current. There have heretofore been no satisfactory instruments capable of measuring the average value of an applied voltage or current with a high degree of accuracy over an extended frequency range.

Various types of electrical measuring instruments have been devised to operate on the principle of utilizing an electrical amplifier to develop an output current which is proportional to an input current or voltage. This class of instruments is generally referred to as vacuum tube voltmeters and some even include a feature of feedback control of an amplifier to provide the desired measurements. Such instruments as are known, however, depend upon amplifying an applied voltage signal in order to provide a proportional current for an associated indicating meter, and utilize voltage feedback in order to improve the high input impedance of the instrument and to stabilize amplifier gain. However, at best the accuracy of the device is limited and it suffers from effects which are introduced by the aging of amplifier components, fluctuations in power supply levels and the like.

It is therefore a general object of this invention to provide an improved electrical measuring instrument.

It is a further object of this invention to provide an electrical measuring instrument having the capability of measuring applied voltage or current with extreme precision and accuracy.

It is a further object of this invention to provide an electrical measuring instrument having such a high degree of accuracy in measurement that the device may be used as a certified standard measuring instrument.

It is a further object of this invention to provide an electrical measuring instrument which is capable of measuring both D.C. and A.C. over a wide frequency range with high precision.

It is a still further object of this invention to provide an electrical measuring instrument suitable for use as a measurement standard which is responsive to the average value of the applied input voltage or current.

A still further object of this invention is to provide an electrical measuring standard which may be used directly for the measurement of applied voltages of relatively high levels.

In brief, arrangements in accordance with the present invention involve the use of a precision resistor, a high gain amplifier and a rectifier interconnected in a basic circuit such that the amplifier is enabled to compensate for the forward voltage drop of the rectifier, thus providing, in effect, an ideal rectifier. The rectifier is coupled in a feedback loop to provide current feedback for the amplifier in a manner such that the amplifier maintains a substantially zero voltage drop across the points in the circuit to which the amplifier is connected. As a result, the entire voltage being measured is dropped across the precision resistor and substantially all of the current flowing therethrough is supplied to the output of the circuit without being affected by other voltages in the measuring circuit. A meter coupled to the output of this circuit provides an indication of the voltage applied at the circuit input with an accuracy which is comparable to the accuracy of the precision resistor. Thus with the use of only one precision element, together with various circuit elements which are generally available, a measuring instrument is provided which has the capability of matching the accuracy of the best laboratory standard measuring instruments. The voltage reading of the coupled meter is a function of the average value of the applied input waveform. However, for any given shape of waveform, the average value bears a constant relationship to the effective and peak values of the waveform so that either of these values may be indicated directly simply by calibrating the meter scale with an appropriate scale factor. For a pure sine wave, the average value (taken as the average of one-half cycle) is equal to 63.6% of the peak value of the waveform. The various arrangements in accordance with the present invention provide for the first time a measuring system which is truly operable in measuring input voltage or current from D.C. up to high frequency A.C. without any gap in the range. The circuit of the invention may be used to provide desired voltage measurements with extreme precision over a considerable range and magnitude of applied voltages or it may be used as a monitoring device to provide an indication of very slight deviations from some preselected level.

In one particular arrangement in accordance with the invention, a meter is simply coupled across the output terminals of the basic circuit in order to provide a desired measurement reading. In order to achieve the desired frequency response down to low frequency A.C., a filter such as a capacitor applied across the terminals to which the meter is connected may be used. If extremely low frequency A.C. is to be measured, a ballistic galvanometer having a period as high as 1000 seconds may be used as the indicating meter if desired. In other arrangements in accordance with the invention, various combinations of meters or galvanometers may be coupled to the output terminals of the basic circuit in order to achieve measurements of even greater precision.

One particular arrangement in accordance with the invention utilizes a pair of precision resistors in a selected ratio of resistances to achieve the desired measurements. In order to provide improved accuracy, the respective resistors may be physically positioned in a thermal transfer chamber and thermally coupled together in order to eliminate any measurement discrepancies which might otherwise result from joule heating.

A better understanding of the present invention may be had from a consideration of the following detailed description, taken in conjunction with the accompanying drawing, in which:

FIG. 1 is a schematic diagram of an idealized electrical measuring circuit;

FIG. 2 is a schematic diagram of one particular arrangement in accordance with the invention;

FIG. 3 is a graphical representation of a waveform present under particular conditions at one point in the circuit of FIG. 2;

FIG. 4 is a combination block and schematic diagram of a second particular arrangement in accordance with the invention;

FIG. 5 is a combination block and schematic diagram of a third particular arrangement in accordance with the invention;

FIG. 6 is a combination block and schematic diagram of a fourth particular arrangement in accordance with the invention;

FIG. 7 is a representation of a particular configuration of elements which may be employed in the arrangements of FIGS. 4, 5 and 6; and FIG. 8 is a schematic diagram of still another particular arrangement in accordance with the invention.

In FIG. 1 a simple measuring circuit is shown consisting of a voltage dropping resistor R and a meter M connected in a series path between a pair of terminals. Although the meter M is activated by current in the circuit, it can be calibrated to indicate voltage by the use of an appropriate scale. The accuracy of measurement of such a circuit is limited by the accuracy of the value of the resistor R and by the accuracy and sensitivity of the meter M. The accuracy of the depicted measuring circuit is further adversely affected by the fact that the meter M presents a non-zero impedance which must be considered in conjunction with the value of the resistor R in effecting the division of applied input voltage between the two elements. Since the meter M is essentially a D.C. responsive device, the circuit of FIG. 1 as shown is incapable of measuring A.C. In order that a circuit of this type may be used for measuring A.C. voltages, various arrangements of rectifiers or thermocouples may be provided in conjunction with the meter M in order to convert an A.C. voltage to a related D.C. voltage. However, this introduces further inaccuracies because of the non-linear response of the various elements as provided or because of a thermal time lag in the associated thermocouples.

The particular arrangement of the invention represented in FIG. 2 overcomes the above described deficiencies which are presented in previously known circuits. In the basic circuit 10 of FIG. 2 an input resistor R, designated 12, is connected to a plurality of rectifying diodes 14, 15, 16 and 17 and to an amplifier 20 across a pair of input terminals 22 and 24. The diodes 14–17 are connected in a bridge rectifier configuration with the input nodes of the bridge rectifier coupled respectively to one input terminal of the amplifier 20 and to the output terminal thereof. The remaining nodes of the bridge, which may be considered the output nodes, are connected to a capacitor 26 and an indicating meter 28.

The amplifier 20 may be any high gain amplifier having the capability of amplifying both A.C. and D.C. and maintaining the voltage across its input terminals at substantially zero. Any one of a number of conventional amplifiers may be utilized for this purpose; a typical amplifier which is suitable is described by Edwin A. Goldberg in "Stabilization of Wide Band D.C. Amplifiers for Zero and Gain," page 296 ff., RCA Review, June 1950. The resistor 12 is a precision resistor which is certified by the Bureau of Standards to have an accuracy such that it may be used as a resistance standard.

The bridge configuration of the diodes 14–17 and the associated meter 28 and capacitor 26 constitute in effect a feedback path between the output of the amplifier 20 and one of its input terminals. The amplifier 20 thereby operates to maintain the voltage at its output at whatever level is necessary in order to compensate for the voltage drops across the respective elements of the feedback path.

The basic circuit of the present invention as shown in FIG. 2 should be carefully distinguished from previously known amplifier type measuring instruments of the so-called vacuum tube voltmeter category. Vacuum tube voltmeters provide for voltage feedback control of a particular amplifier in order to develop an output current or voltage which is proportional to a signal applied at the amplifier input. It will be seen that the accuracy of the meter then depends directly upon the stability of amplification provided by the amplifier. With such a design, the stability and accuracy of the instrument are inherently limited and are adversely affected by the aging of the circuit components. In the novel arrangements of the present invention as shown in FIG. 2 on the other hand, the accuracy of the measurements provided by the depicted circuit is not dependent upon the stability of the gain of the amplifier 20 as such. The actual current which is drawn from the circuit being measured is applied directly to the indicating meter without being affected by the amplifier 20. The amount of current drawn off by the amplifier itself is so minute as to be insignificant in its effect on the precision of the measurement provided. The amplifier 20 simply serves to maintain a substantially zero potential between its input terminals so that all of the voltage to be measured is dropped across the precision resistor 12. As a result the current which is supplied to the meter 28 is precisely equal to the input voltage divided by the resistance R and is unaffected by the voltage drops across the rectifier or the meter 28 itself.

In order to explain the basis for the extraordinary precision which may be achieved in the operation of the circuit of the invention as shown in FIG. 2, let it be assumed that a voltage $E_{in}$ is applied across the terminals 22, 24 such that, at a given instant, a current $i_R$ is caused to flow in the resistor 12. The amplifier 20 which is coupled to the resistor 12 is such that it passes only a very insignificant portion of the current flowing in the resistor 12. A typical ratio of the amplifier input current $i_A$ to the current $i_R$ of resistor 12 is of the order of $10^{-7}$. Thus it will be seen that the current $i_R$ in the resistor 12 flows into the remainder of the circuit substantially undiminished as the current $i_M$. For the polarity of current shown, the current $i_M$ flows through the rectifier 14, through the meter 28, and thence through the rectifier 15 to the output terminal of the amplifier 20. In doing so, the current $i_M$ develops voltage drops across the rectifying diodes 14 and 15 and across the meter 28. In a typical bridge rectifier using silicon rectifiers, the voltage across the rectifiers conducting in the forward direction is approximately 0.7 volt each. Furthermore, this voltage varies somewhat as a non-linear function of the current through the rectifier. In the circuit of the present invention as shown in FIG. 2, however, the amplifier 20 supplies the current and voltage for the rectifiers 14, 15 or 16, 17, as the case may be, so as to compensate completely for the error which would otherwise be introduced in the measuring circuit due to the bridge rectifier.

This may be appreciated from a study of the waveform shown in FIG. 3 which graphically represents the voltage at a point B at the output of the amplifier 20 in the circuit of FIG. 2 when $E_{in}$ is an A.C. sine wave. By virtue of the fact that the amplifier 20 maintains its own input voltage substantially at zero, and because the rectifiers 14–17 are connected in the feedback path from the output of the amplifier 20 to the input thereof, the output voltage of the amplifier 20 exactly compensates for the voltage drop across the conducting rectifiers. As represented in FIG. 3, which is a graph of voltage as a function of time, the negative portion 30 of the depicted waveform corresponds to the positive half cycle of applied input voltage at the terminals 22 and 24 such as to cause current flow in the direction of arrows as shown in FIG. 2. The positive portion 32 of the waveform of FIG. 3 corresponds to the negative half cycle of applied input voltage which results in current opposite to the direction of the arrows as shown in FIG. 2. Should the applied voltage $E_{in}$ be D.C., the compensating voltage at the output B of the amplifier 20 is a steady level of constant magnitude equal but of opposite polarity to the voltage drops across the rectifiers and the meter.

By thus compensating for the undesirable voltage drops which ordinarily tend to limit the accuracy of conventional measuring circuits, the resulting reading on the meter 28 has an accuracy comparable to the accuracy of the precision resistor 12. Typical values for the resistor 12 and the respective currents in various portions in the circuit when a voltage $E_{in}$ equal to 100 volts is applied at the input terminals 22, 24 are as follows:

$R = 10,000$ ohms,
$i_R = 10^{-2}$ amperes,
$i_A = 10^{-9}$ amperes,
$i_M = i_R - i_A = i_R$ within 1 part in 10 million,
Voltage at the input of the amplifier 20 equals 0.1 millivolt.

The applied voltage $E_{in}$ may be either A.C. or D.C. since the circuit of the invention serves to compensate for the voltage drop across the rectifiers which occurs whenever a pair of rectifiers is conducting. For an applied A.C. voltage, one pair of rectifiers 14, 15 will conduct on one half cycle and the other pair of rectifiers 16, 17 will conduct on the other half cycle. If a D.C. voltage is applied at the input terminals 22, 24, the pair of rectifiers which conducts is dependent upon the polarity of the applied D.C. voltage. Regardless of polarity however the reading of the meter 28 is presented as a positive measurement, thus advantageously eliminating the usual requirement that polarity of meter connections be observed in D.C. measurements.

A consideration of various factors which tend to limit the response of the above described arrangement of the invention may serve to give an indication of the extreme accuracy provided in the practice of the invention. During the time when a pair of the rectifiers, 14, 15 or 16, 17, is reverse biased, a leakage current in the reverse direction is encountered. This, however, is very small, particularly for good quality silicon rectifiers, and can be brought down to approximately $10^{-8}$ amperes at the very low reverse bias of approximately 1.5 volts per diode. The shunt capacity of the rectifying diodes 14–17 is of the order of 3 to 5 micromicrofarads each and this shunt capacitance is a factor which tends to limit the upper frequency response. However, the effect is very minor and amounts to only approximately .001% dropoff in response at 4000 cycles per second. Another factor is due to hole storage in the diodes. This effect is similar to that of the shunt capacity of the rectifying diodes and is approximately equal in magnitude. Aside from the insignificant effects just mentioned, arrangements in accordance with the present invention completely compensate for the conventional voltage drops ordinarily encountered across the conducting diodes of the bridge rectifier so that the result is an ideal rectifier having essentially no voltage drop in the forward direction.

Turning now to FIG. 4, another particular arrangement in accordance with the invention is shown schematically in which the basic circuit 10 of FIG. 2 is utilized in conjunction with additional circuitry in order to provide even greater precision of measurement. The arrangement of FIG. 4, instead of being designed for the measurement of various voltages over a broad range of magnitudes, is intended for use in monitoring with extreme precision an applied voltage which is to be maintained at a preset level. Alternatively, the arrangement of FIG. 4 may also be used as an expanded scale measuring circuit capable of measuring very slight deviations from a central voltage level. In FIG. 4 the block 10 corresponds to the basic circuit of FIG. 2 shown within the dashed outline. Connected to the right-hand side of the block 10 are a null meter 40, a second precision resistor $R'$, designated 42, a variable resistor 43 and a fixed voltage source 44 which is shown in the form of an electrolytic cell. A galvanometer 46 and a standard cell 47, such as a Weston or Clark standard cell, are connected in series with each other across the ends of the precision resistor 42.

In the operation of the arrangement shown in FIG. 4, the input voltage $E_{in}$ (either A.C. or D.C.) is intended to be maintained at a fixed preselected level. The circuit 10 operates in the fashion described in connection with FIG. 2 to produce a voltage at the output terminals of the block 10 having a polarity as indicated. The variable resistor 43 is then varied until the galvanometer 46 reads exactly zero, indicating that the voltage drop across the resistor 42 exactly equals the potential of the standard cell 47. Next $E_{in}$ is adjusted until the null meter 40 reads zero with the galvanometer 46 also at zero. It may be necessary to repeat these adjustments once or twice because of interaction between them. The resistance value of the precision resistor 42 is selected in accordance with the resistance of the resistor 12 in the block 10 and the potential of the standard cell 47 so that the voltage drop across the resistor 42 exactly equals the potential of the standard cell 47 when the null conditions are established. Thus, when the circuit has been adjusted so that the null meter 40 and the galvanometer 46 read zero, the input voltage $E_{in}$ is at the desired level. Should the voltage $E_{in}$ be slightly greater than the preselected level, the null meter 40 will deflect from its zero position in one direction, whereas, if the voltage $E_{in}$ is slightly less than the preselected level, the null meter 40 will be deflected from its zero position in the opposite direction. Thus an extremely precise measurement of the deviation of the applied voltage $E_{in}$ from a preselected level may be provided, with the null meter 40 being effective as an expanded scale voltmeter.

The circuit of FIG. 4 may also be used to measure the level of applied voltage very precisely by utilizing a variable resistance of known value, such as a decade box or other precision variable resistor, for the resistor 42. The circuit is then calibrated as before but the resistor 42 may be set to the value which provides zero current in the galvanometer 46 and the meter 40. At this point, the level of applied voltage $E_{in}$ may be determined very precisely from a knowledge of the ratio of resistances $R$ and $R'$ and the voltage across resistor 42 (equal to the standard cell 47).

FIG. 5 is a schematic diagram of a slightly different arrangement of the invention which is similar to the circuit of FIG. 4 but is designed to eliminate the need for repeating the adjustment step. The principal difference between the two circuits is that a switch 51 and a galvanometer 46' are connected in place of the null meter 40. In operation, the switch 51 is closed while the resistor 43 is varied until the galvanometer 46 reads zero. The switch 51 is then opened and $E_{in}$ may be measured. The reading of the galvanometer 46' is a measure of the deviation of the applied voltage $E_{in}$ from the preselected value. The voltage $E_{in}$ may then be adjusted until the reading of the galvanometer 46' becomes zero, which is an indication that the voltage $E_{in}$ is at the preselected level. If desired, a single galvanometer may be used in this arrangement with appropriate means for switching it between the positions 46 and 46'.

FIG. 6 is a schematic diagram of a simplified arrangement corresponding to those shown in FIGS. 4 and 5. As before, the resistor 42 is a precision resistor having a value of resistance selected in accordance with the level of input voltage to be established, the value of the precision input resistor 12 in the block 10, and the potential of the standard cell 57. In this circuit, a switch 56 is included for disconnecting the galvanometer 58 from the remainder of the circuit when adjustment of the input voltage is not being made. In the operation of the arrangement of FIG. 6, the switch 56 is closed and the voltage $E_{in}$ is adjusted until the galvanometer 58 reads zero which corresponds to the selected condition for the voltage $E_{in}$. A more rapid adjustment may thus be made without the necessity of performing the preliminary calibration step.

FIG. 7 illustrates one particular arrangement for the two precision resistors employed in the circuit arrangements of FIGS. 4, 5 and 6 which may be utilized in order to provide additional compensation for the temperature sensitivity which is inherent in the use of the precision resistors. As shown in FIG. 7, the precision resistors 12 and 42 may be physically mounted in a thermally coupled relationship within a container 62 of a suitable fluid, such as an oil bath. The two resistors 12 and 42 should be constructed of the same material and should be mounted in close proximity so that the temperature sensitivity resulting from joule heating may be compensated insofar as possible by producing identical effects in the two resistors.

FIG. 8 is a schematic diagram of an alternative arrangement of the basic circuit of the invention as shown in FIG. 2 which may be utilized in place of the block 10 in the various circuits of FIGS. 4, 5 and 6 in the event that it is desired to monitor an A.C. voltage only. In FIG. 8 the block designated 10' corresponds to the block 10 of FIG. 2 and the respective circuits are similar except that a pair of capacitors 35 and 36 is substituted for the pair of rectifiers 15 and 16. The arrangement of FIG. 8 provides a full wave voltage doubler with compensation for voltage drop across the diodes 14 and 17 being provided by the amplifier 20 in the manner already described for the circuit 10 of FIG. 2. The voltage doubler circuit 10' of FIG. 8 produces half the normal output current to the meter 28 but it also develops half the voltage drop across the conducting diode as that which is encountered when a bridge configuration is employed. One advantage achieved through the use of the circuit of FIG. 8 is the improved high frequency response because the shunt capacitance effects are reduced in this circuit. Furthermore, the circuit can be referenced to ground through the capacitor 37 which further reduces the undesired shunt capacity effects. It will be understood that this circuit does not have the capability of measuring D.C. voltages or those alternating voltages which are so low in frequency as to approach D.C.; however, where such a capability is not essential, the improved high frequency response and increased simplicity of the auxiliary arrangement make the circuit desirable for many applications. The circuit of FIG. 8 may be used to advantage, for example, in place of a conventional vacuum tube voltmeter, which in general use attains an accuracy of measurement of only 1 or 2%. By contrast, the circuit shown in FIG. 8 provides an accuracy which is from 10 to 100 times better. It should be pointed out that, if desired, the diodes 14 and 17 can be interchanged with the capacitors 35 and 36 without affecting the operation of the circuit.

The above described arrangements of the present invention have been discussed from the standpoint of voltage measuring devices in order to emphasize the high degree of precision realized thereby. However, it may be mentioned that the various arrangements may also be employed to provide current measurements by applying the current around the input resistor 12 of FIG. 2. This may readily be done by simply shorting the terminals of the resistor 12 if desired. Since the amplifier 20 maintains substantially zero voltage across its input, the corresponding current measurements are provided at negligible input power, thus reducing the tendency of the measuring instrument to disturb the circuit to which it is connected.

The above described arrangements of the invention give promise for the first time of achieving a level of precision comparable to that provided by laboratory standard measuring instruments in structural configurations which are compact and rugged enough to be incorporated in instruments suitable for normal shop use. This is accomplished in accordance with an aspect of the invention through the use of a compensating amplifier which is so connected that it cancels the normal voltage drops encountered in a rectifier which is employed to convert A.C. to D.C. The precision provided by arrangements in accordance with the present invention is equal to that prescribed by the Bureau of Standards for certification as a fundamental standard measuring device. The accuracy is so high that the only practical way of testing the accuracy of the device is to utilize its own internal instrumentation. Testing is done on D.C. by shorting the respective diodes in sequence while observing the output meter such as 28 of FIGS. 2 and 8 to test the forward voltage drop of the diodes. The reverse leakage current of the diodes can be checked by removing the diodes from the circuit in sequence while observing the meter 28. If each of the elements is operating satisfactorily, there should be no significant change in the reading of the meter 28. The input voltage to the amplifier 20 may be measured with a calibrated oscilloscope. Because of the extremely high gain provided by the amplifier 20, the voltage at its input need be maintained at a given level with an accuracy of only 10%. If desired, a warning device may be connected across the input leads of the amplifier 20 to provide an indication in the event of malfunction.

Although there have been described above specific arrangements of a precision electrical measuring circuit in accordance with the invention for the purpose of illustrating the manner in which the invention may be used to advantage, it will be appreciated that the invention is not limited thereto, but that the principles thereof may find application in other circuit arrangements. For example, the current presented at the output of the basic circuit 10 of FIG. 2 may, instead of being applied to the meter 28, be directed to a control device such as a magnetic amplifier for utilization in associated circuitry. It is also possible to utilize the current in a feedback mechanism coupled to control the input voltage so as that the voltage $E_{in}$ may be maintained automatically at a very precisely determined preselected level. Any other modifications, variations, or equivalent arrangements falling within the scope of the annexed claims should be considered to be a part of the invention.

What is claimed is:

1. An electrical measuring system for measuring either A.C. or D.C. voltage with a high degree of precision comprising a pair of input terminals to which the voltage to measured may be applied, a first precision resistor connected in a series current path leading from one of said terminals, an amplifier having the capability of amplifying both A.C. and D.C. signals connected with its input in series between the first precision resistor and the other of said terminals, a rectifier coupled between the output and input of the amplifier, an indicating device connected to receive unidirectional current from the rectifier without being limited by the voltage drop across the rectifier, a voltage source connected in series with the indicating device and having a polarity such as to oppose the forward direction of current through the rectifier, a second precision resistor coupled in shunt with the indicating device, a variable resistor and a second voltage source coupled to the indicating device and the second precision resistor, and a null indicating device connected across the rectifier output.

2. An electrical measuring system for measuring either A.C. or D.C. voltage with a high degree of precision comprising a pair of input terminals to which the voltage to be measured may be applied, a first precision resistor connected in a series current path leading from one of said terminals, an amplifier having the capability of amplifying both A.C. and D.C. signals connected with its input between the precision resistor at the end remote from said one terminal and the other of said terminals, a rectifier coupled between the output and input of the amplifier, a first indicating device connected to receive unidirectional current from the rectifier without being limited by the voltage drop across the rectifier, a second indicating device connected to the rectifier, a voltage source connected in series with the second indicating device and having a polarity such as to oppose the forward direction of current through the rectifier, a second precision resistor coupled in shunt with the second indicating device, a variable resistor and a second voltage source coupled to the second indicating device and the second precision resistor, and means including a shorting switch connected across the rectifier for providing a null reading on the first indicating device.

References Cited by the Examiner

UNITED STATES PATENTS

| | | | |
|---|---|---|---|
| 2,290,559 | 7/1942 | Hitchcock | 324—119 |
| 2,521,522 | 9/1950 | Keitley | 324—119 X |
| 2,762,975 | 9/1956 | Bregar | 324—131 X |
| 2,944,218 | 7/1960 | Newbold | 330—110 X |
| 3,068,410 | 12/1962 | Galman | 324—119 X |
| 3,200,331 | 8/1965 | Bloom | 324—106 |

WALTER L. CARLSON, *Primary Examiner.*

RUDOLPH V. ROLINEC, *Examiner.*

J. J. MULROONEY, *Assistant Examiner.*